(12) United States Patent
Ramachandra (10) Patent No.: US 11,050,676 B2
(45) Date of Patent: Jun. 29, 2021

(54) METHOD AND SYSTEM FOR TRIGGERING OF INTERNET OF THINGS (IOT) DEVICES

(71) Applicant: Wipro Limited, Bangalore (IN)

(72) Inventor: Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/546,333

(22) Filed: Aug. 21, 2019

(65) Prior Publication Data
US 2020/0412664 A1    Dec. 31, 2020

(30) Foreign Application Priority Data

Jun. 28, 2019   (IN) .............................. 201941025985

(51) Int. Cl.
| | | |
|---|---|---|
| *H04L 12/911* | (2013.01) | |
| *G06F 16/25* | (2019.01) | |
| *H04L 12/24* | (2006.01) | |
| *H04L 29/08* | (2006.01) | |
| *H04L 29/06* | (2006.01) | |

(52) U.S. Cl.
CPC .......... *H04L 47/746* (2013.01); *G06F 16/252* (2019.01); *H04L 41/0668* (2013.01); *H04L 41/082* (2013.01); *H04L 41/0883* (2013.01); *H04L 41/0886* (2013.01); *H04L 41/12* (2013.01); *H04L 63/08* (2013.01); *H04L 67/12* (2013.01)

(58) Field of Classification Search
CPC ....... H04L 47/746; H04L 41/12; H04L 63/08; H04L 41/082; H04L 41/0668; H04L 41/0883; H04L 41/0886; H04L 67/12; H04L 67/327; G06F 16/252
See application file for complete search history.

(56) References Cited

U.S. PATENT DOCUMENTS

| | | | |
|---|---|---|---|
| 9,497,572 B2 | 11/2016 | Britt et al. | |
| 9,571,974 B2 | 2/2017 | Choi et al. | |
| 9,853,826 B2 * | 12/2017 | Shuman ................ | H04L 67/12 |
| 10,123,250 B2 * | 11/2018 | Schwengler ............ | H04L 41/12 |

(Continued)

FOREIGN PATENT DOCUMENTS

| | | |
|---|---|---|
| CN | 103580968 A | 2/2014 |
| CN | 108389574 A | 8/2018 |
| KR | 20170109867 A | 10/2017 |

*Primary Examiner* — Ramy M Osman
(74) *Attorney, Agent, or Firm* — Finnegan, Henderson, Farabow, Garrett & Dunner, LLP (57) ABSTRACT

The present disclosure provides a method and a system for triggering of Internet of things (IoT) devices. The system comprising a processor causes the processor to receive a change in output of first IoT device from a plurality of IoT devices, wherein the plurality of IoT devices are connected to each other, determine one or more connectivity paths between the plurality of IoT devices including the first IoT device based on stored connectivity paths between the plurality of IoT devices in a database, select one of the determined one or more connectivity paths between the plurality of IoT devices, wherein the selecting is based on similarity of metadata of each of the plurality of IoT devices in each of the one or more connectivity paths and trigger one or more IoT devices of the plurality of IoT devices in the selected connectivity path.

17 Claims, 6 Drawing Sheets

DETECT FAILURE OF ONE OF THE ONE OR MORE IOT DEVICES OF THE PLURALITY OF IOT DEVICES IN THE SELECTED CONNECTIVITY PATH — 409

DETERMINE AN ALTERNATE CONNECTIVITY PATH BETWEEN THE PLURALITY OF IOT DEVICES INCLUDING THE FIRST IOT DEVICE — 411

TRIGGER AN ALTERNATE IOT DEVICE OF THE PLURALITY OF IOT DEVICES IN THE ALTERNATE CONNECTIVITY PATH BASED ON THE CHANGE IN OUTPUT OF THE FIRST IOT DEVICE — 413

(56) References Cited

U.S. PATENT DOCUMENTS

| | | | | |
|---|---|---|---|---|
| 10,644,961 | B2* | 5/2020 | Nolan | H04L 41/12 |
| 2005/0038658 | A1* | 2/2005 | Sladden | H04L 41/0266 |
| | | | | 704/270.1 |
| 2006/0074502 | A1* | 4/2006 | McFarland | H04W 40/248 |
| | | | | 700/47 |
| 2007/0184684 | A1* | 8/2007 | Bormann | G05B 9/02 |
| | | | | 439/76.1 |
| 2011/0235627 | A1* | 9/2011 | Wang | H04L 63/08 |
| | | | | 370/338 |
| 2013/0250754 | A1* | 9/2013 | Vasseur | H04W 40/28 |
| | | | | 370/225 |
| 2016/0165650 | A1* | 6/2016 | Kim | H04L 12/6418 |
| | | | | 370/329 |
| 2017/0230845 | A1* | 8/2017 | Pajona | H04W 16/28 |
| 2018/0013578 | A1* | 1/2018 | Gozloo | G06F 3/0655 |
| 2018/0183874 | A1* | 6/2018 | Cook | H04L 41/0886 |
| 2018/0285217 | A1* | 10/2018 | Smith | G06F 21/00 |
| 2018/0351792 | A1* | 12/2018 | Hunter | H04L 41/0883 |
| 2018/0351793 | A1* | 12/2018 | Hunter | H04L 41/0883 |
| 2019/0215244 | A1* | 7/2019 | Choi | H04L 41/12 |
| 2019/0253405 | A1* | 8/2019 | Linton | H04L 63/08 |
| 2019/0349263 | A1* | 11/2019 | Ghosh | H04L 41/16 |
| 2020/0099575 | A1* | 3/2020 | Jan | H04L 41/0668 |

* cited by examiner

METHOD AND SYSTEM FOR TRIGGERING OF INTERNET OF THINGS (IOT) DEVICES

TECHNICAL FIELD

The present subject matter is related in general to Internet of things (IoT) devices, more particularly, but not exclusively to a method and a system for triggering of IoT devices for regulating the IoT devices.

BACKGROUND

Today, there is a plethora of devices over and around the body of a person providing a lot of data and enabling multiple applications in real-time. While the devices communicate to each other over the Internet and work in tandem in a limited sense, they are still loosely coupled in general. The interaction or the connection path between these devices is static i.e. connectivity cannot be made by the devices themselves and the interaction or the connection path does not change depending upon the dynamics of the user associated with these devices. For example, a temperature sensor on the body of a person and a device that switches on a fan do not communicate to each other. Although the user might be feeling hot, automatic switching ON of the fan through the Internet of things (IoT) device does not happen. Furthermore, when a device fails in a particular connectivity path consisting of devices, the connection path becomes redundant due to static nature of connectivity between the devices.

The information disclosed in this background of the disclosure section is only for enhancement of understanding of the general background of the invention and should not be taken as an acknowledgement or any form of suggestion that this information forms the prior art already known to a person skilled in the art.

SUMMARY

In some embodiments, the present disclosure may relate to a method for triggering of IoT devices for regulating the IoT devices. The method includes receiving a change in output of first IoT device from a plurality of IoT devices, wherein the plurality of IoT devices are connected to each other, determining one or more connectivity paths between the plurality of IoT devices including the first IoT device based on stored connectivity paths between the plurality of IoT devices in a database, selecting one of the determined one or more connectivity paths between the plurality of IoT devices, wherein the selecting is based on similarity of metadata of each of the plurality of IoT devices in each of the one or more connectivity paths and triggering one or more IoT devices of the plurality of IoT devices in the selected connectivity path based on the change in output of the first IoT device.

In some embodiments, the present disclosure may relate to an IoT assistance system for triggering of IoT devices for regulating the IoT devices. The IoT assistance system may include a processor and a memory communicatively coupled to the processor, wherein the memory stores processor-executable instructions, which on execution, may cause the processor to receive a change in output of first IoT device from a plurality of IoT devices, wherein the plurality of IoT devices are connected to each other, determine one or more connectivity paths between the plurality of IoT devices including the first IoT device based on stored connectivity paths between the plurality of IoT devices in a database, select one of the determined one or more connectivity paths between the plurality of IoT devices, wherein the selecting is based on similarity of metadata of each of the plurality of IoT devices in each of the one or more connectivity paths and trigger one or more IoT devices of the plurality of IoT devices in the selected connectivity path based on the change in output of the first IoT device.

In some embodiments, the present disclosure may relate to a non-transitory computer readable medium including instructions stored thereon that when processed by at least one processor cause an IoT assistance system to perform operations comprising receiving a change in output of first IoT device from a plurality of IoT devices, wherein the plurality of IoT devices are connected to each other, determining one or more connectivity paths between the plurality of IoT devices including the first IoT device based on stored connectivity paths between the plurality of IoT devices in a database, selecting one of the determined one or more connectivity paths between the plurality of IoT devices, wherein the selecting is based on similarity of metadata of each of the plurality of IoT devices in each of the one or more connectivity paths, and triggering one or more IoT devices of the plurality of IoT devices in the selected connectivity path based on the change in output of the first IoT device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relate to a method and a system for triggering of IoT devices for regulating the IoT devices. Typically, in an automation scenario. IoT devices communicate with each other to perform certain task. However, the interaction or the connection path between these devices is static such that connectivity cannot be made by the devices dynamically or by (the devices) themselves. Also, if an IoT device stops working, the corresponding connectivity path and the other IoT devices connected in the same path fail to produce any desired result. The present disclosure provides a method that may sense a change in output of one of IoT devices from a plurality of IoT devices, following which the method may determine one or more possible connectivity paths between the plurality of IoT devices from a database and select one optimum connectivity path between the plurality of IoT devices. Subsequently, the method may trigger at least one IoT device in the selected connectivity path to perform a desired task on the basis of changed output of one of the IoT devices. The present disclosure allows IoT devices to communicate between themselves and form a solution to a problem dynamically.

In summary, the present disclosure may consist of following 3 steps: formation of IoT devices connectivity paths, identifying the right source-destination IoT device pair in the connectivity path to realize a solution and in case of an IoT device failure, providing an alternate IoT device i.e. when an IoT device breaks down in a connectivity path, a closely matching IoT device may take over the role of the faulty IoT device.

Figure 1:
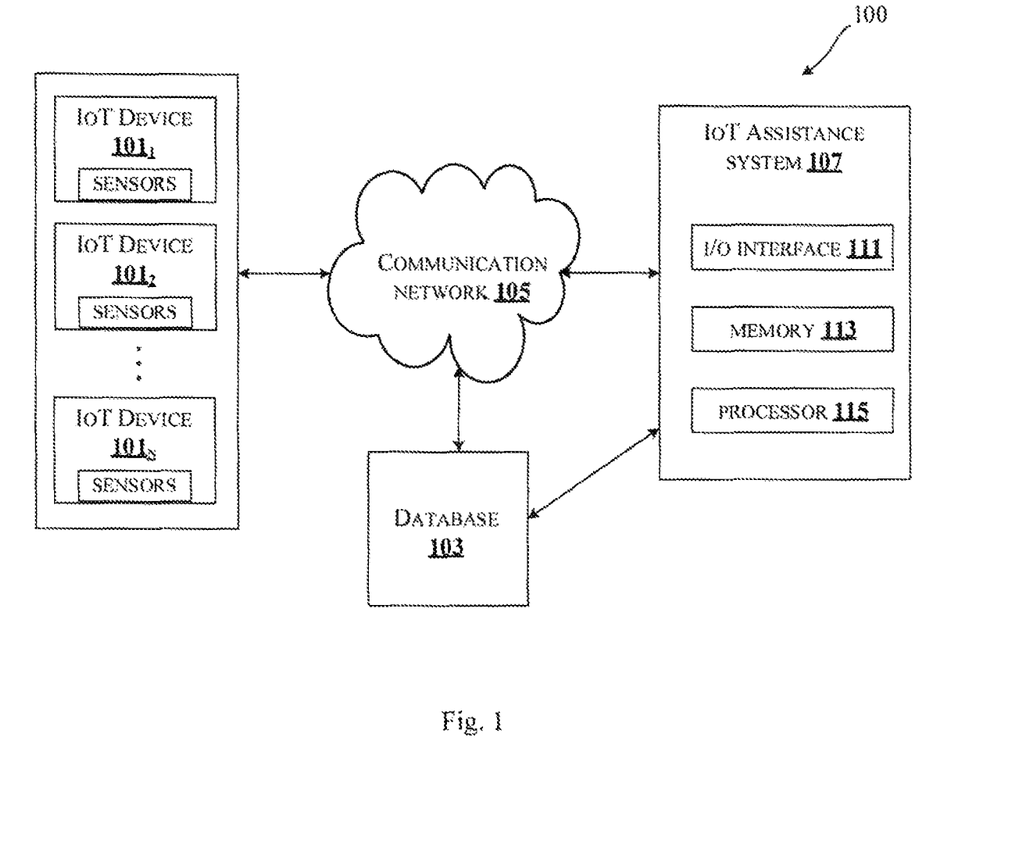
FIG. 1 illustrates an exemplary environment for triggering of IoT devices for regulating the IoT devices in accordance with some embodiments of the present disclosure.

FIG. 1 illustrates an exemplary environment for triggering of IoT devices for regulating the IoT devices in accordance with some embodiments of the present disclosure.

As shown in the FIG. 1, the environment 100 includes an lot device $101_1$, an IoT device $101_2$, . . . , an IoT device $101_N$ (collectively referred as plurality of IoT devices 101), a database 103, a communication network 105 and an IoT assistance system 107. The plurality of IoT devices 101 may be connected through the communication network 105 to the IoT assistance system 107. In an embodiment, the plurality of IoT devices 101 may include, but are not limited to, electronic appliances, electronic devices or any objects embedded with electronics, sensors and Internet connectivity. The plurality of IoT devices 101 may run on Universal plug and play (UPnP) protocol. A person skilled in the art would understand that, any IoT devices, not mentioned explicitly, may also be used as the IoT devices in the present disclosure. Here, any inputs from a user may be received through user interface (not shown in Fig.) of one or more IoT devices or any user device. The plurality of IoT devices 101 may provide real-time output data to the IoT assistance system 107 via the communication network 105 and in turn the plurality of IoT devices 101 may receive a trigger signal from the IoT assistance System 107 via the communication network 105. The real-time output data may be an output signal. The communication network 105 may include, but is not limited to, a direct interconnection, an e-commerce network, a Peer-to-peer (P2P) network, Local area network (LAN), Wide area network (WAN), wireless network (for example, using Wireless Application Protocol), Internet, Wi-Fi. Bluetooth and the like.

In the embodiment, the IoT assistance system 107 may determine one or more connectivity paths between a plurality of IoT devices 101 from a database 103, select one of the determined one or more connectivity paths between the plurality of IoT devices 101 and trigger one or more IoT devices in the selected connectivity path. The IoT assistance system 107 may include an I/O interface 111, a memory 113 and a processor 115. The I/O interface 111 may be configured to receive the real-time output data from the plurality of IoT devices 101. Analogously, the I/O interface 111 may be configured to transfer a trigger signal to the plurality of IoT devices 101. The I/O interface 111 may employ communication protocols/methods such as, without limitation, audio, analog, digital, monoaural, Radio Corporation of America (RCA) connector, stereo, IEEE-1394 high speed serial bus, serial bus, Universal serial bus (USB), infrared, Personal system/2 (PS/2) port, Bayonet Neill-Concelman (BNC) connector, coaxial, component, composite, Digital visual interface (DVI), High-definition multimedia interface (HDMI), Radio frequency (RF) antennas, S-Video, Video graphics array (VGA), IEEE 802.11b/g/n/x, Bluetooth, cellular (e.g., Code-division multiple access (CDMA), High-speed packet access (HSPA+), Global system for mobile communications (GSM), Long-term evolution (LTE), Worldwide interoperability for microwave access (WiMax), or the like.

The real-time output data received by the I/O interface 111 and connectivity paths between a plurality of IoT devices 101 and a trigger to IoT devices in the received connectivity paths to be presented to the IoT devices through the I/O interface 111 may be stored in the memory 113. The memory 113 may be communicatively coupled to the processor 115 of the IoT assistance system 107. The memory 113 may, also, store processor instructions which may cause the processor 115 to execute the instructions for triggering of IoT devices. The memory 113 may include, without limitation, memory drives, removable disc drives, etc. The memory drives may further include a drum, magnetic disc drive, magneto-optical drive, optical drive. Redundant Array of Independent Discs (RAID), solid-state memory devices, solid-state drives, etc.

The processor 115 may include at least one data processor for triggering of IoT devices. The processor 115 may include specialized processing units such as integrated system (bus) controllers, memory management control units, floating point units, graphics processing units, digital signal processing units, etc.

In the embodiment, the IoT assistance system 107 may exchange data with a database 103 directly or through the communication network 105. The database 103 may be populated or stored with data that includes at least one connectivity path, IoT devices in each connectivity path, the list of the plurality of IoT devices 101 and the corresponding metadata. Here, the metadata may comprises at least one of information related to the IoT devices, intended services or applications of the IoT devices, service description of the IoT devices, subscription information of the IoT devices, device capabilities of the IoT devices, type of the IoT devices, location of the IoT devices, input and output information associated with the IoT devices and connectivity paths between the IoT devices in natural language representation. The natural language representation may refer to a voice input of a user received through the user interface, which may be translated into one or more connectivity paths between the plurality of IoT devices 101. The metadata and the connectivity paths may be filled by the IoT assistance system 107 or may be filled by the user through the user interface or both. The connectivity paths may be stored in a table format in the database 103. An example of the table showing the connectivity paths is shown in Table 1 below.

TABLE 1

| Device | Feed to | Fed by | Application |
|---|---|---|---|
| Digital switch | Fan<br>Light | Thermometer<br>Light Sensor | Speed control<br>Illumination control |
| ... | ... | ... | ... |

The database 103 may, also, be updated by the IoT assistance system 107 or by the user at any time or both. These updates may be related to at least one of the one or more modified metadata for the at least one of the plurality of IoT devices 101 including the one or more modified connectivity paths in the database 103.

In addition, the database 103 may store operating parameters for the one or more IoT devices along with the corresponding change in the output of first IoT device for each connectivity path.

Figure 2:
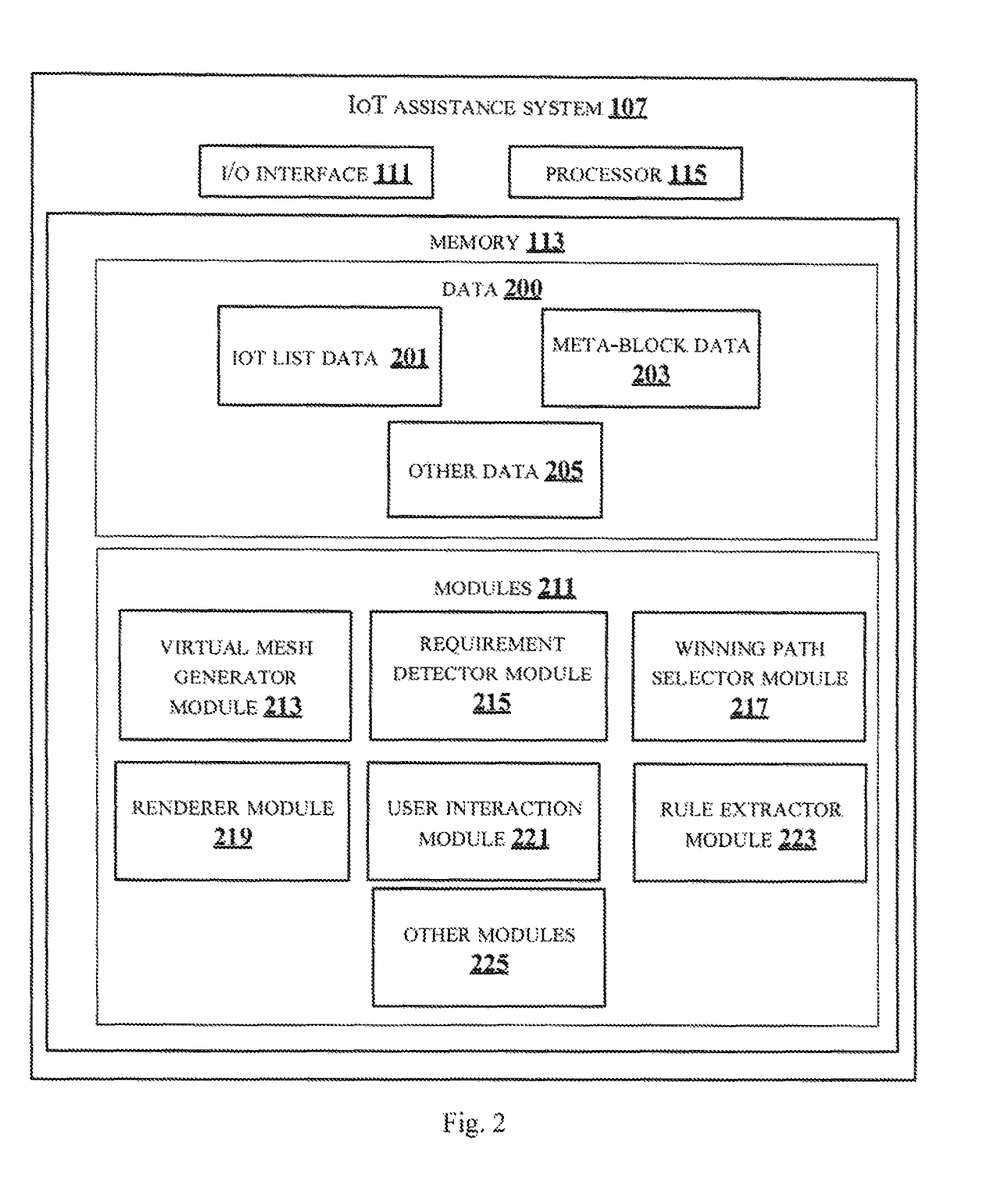
FIG. 2 shows a detailed block diagram of an IoT assistance system in accordance with some embodiments of the present disclosure.

FIG. 2 shows a detailed block diagram of the IoT assistance system in accordance with some embodiments of the present disclosure.

The IoT assistance system 107, in addition to the I/O interface 111 and processor 115 described above, may include data 200 and one or more modules 211, which are described herein in detail. In the embodiment, the data 200 may be stored within the memory 113. The data 200 may include, for example, IoT list data 201, meta-block data 203 and other data 205.

The IoT list data 201 may include a list of all IoT devices to be controlled along with their Uniform Resource Locators (URLs) that provide metadata including service description and subscription information as mandated by UPnP protocol. The list data may be ingested to the IoT assistance system 107 through the I/O interface 111. Here, a user may, also, enter some of the metadata details through the user interface. The IoT list may be supplied to a virtual mesh generator module 213 to create connectivity paths.

The meta-block data 203 may include metadata. Here, the metadata may comprise at least one of information related to the IoT devices, intended services or applications of the IoT devices, service description of the IoT devices, subscription information of the IoT devices, device capabilities of the IoT devices (e.g. cooling-heating of environment around an IoT device), type of the IoT devices (such as fan, air conditioner, thermometer, lamp, etc.), location of the IoT devices, input and output information associated with the IoT devices and connectivity paths between the IoT devices in natural language representation. Here, the natural language representation may refer to a voice input of a user received through the user interface, which may be translated into one or more connectivity paths between the plurality of IoT devices.

The other data 205 may store data, including temporary data and temporary files, generated by modules 211 for performing various functions of the assistance system 107.

In an embodiment, the data 200 in the memory 113 are processed by the one or more modules 211 present within the memory 113 of the IoT assistance system 107. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the IoT assistance system 107. The said modules 211 when configured with the functionality defined in the present disclosure will result in a novel hardware.

In one implementation, the one or more modules 211 may include, but are not limited to, a virtual mesh generator module 213, a requirement detector module 215, a winning path selector module 217, a renderer module 219, a user interaction module 221 and a rule extractor module 223. The one or more modules 211 may, also, include other modules 225 to perform various miscellaneous functionalities of the IoT assistance system 107.

The virtual mesh generator module 213, the user interaction module 221 and the rule extractor module 223 may be used in training the IOT assistance system 107. During the training, the database 103 is populated with data that includes at least one of at least one connectivity path, IoT devices in each connectivity path, a list of the plurality of IoT devices 101 and their corresponding metadata. The requirement detector module 215, the winning path selector module 217 and the renderer module 219 may be used in real-time. During the use of the renderer module 219 in real-time, real-time input data is acquired and processed by the requirement detector module 215, the winning path selector module 217 and the renderer module 219 to provide trigger to an IoT device of the plurality of IoT devices 101 in the selected connectivity path.

The virtual mesh generator module 213 may receive training data that may include a list of the plurality of IoT devices 101 and corresponding metadata of each of the plurality of IoT devices 101. The virtual mesh generator module 213 may generate all the connectivity paths among the plurality of IoT devices 101 considering the nature of the input required to generate a specific type of output in the IoT device. Information to generate connectivity paths among the plurality of IoT devices 101 may be received from a user directly through the user interface or from the metadata associated with the each of the plurality of IoT devices 101. In some embodiments, the IoT devices 101 may provide information to advertise their capabilities through the UPnP protocol. In some embodiments, the user may specify the connectivity paths between the IoT devices in natural language such as "the fan speed should be increased proportionally as the surroundings get hot". Consequently, the corresponding IoT devices spanning a digital thermometer, a digital switch and a fan may get connected to form a connectivity path. The virtual mesh generator module 213 may receive the training data from the I/O interface 111 and from the user interaction module 221. The output of the virtual mesh generator module 213, which may include at least one of the at least one connectivity path, IoT devices in each connectivity path, IoT list data 201 and their corresponding metadata may be stored in the database 103.

The requirement detector module 215 may receive a change in output of first IoT device from a plurality of IoT devices 101, wherein the plurality of IoT devices 101 are connected to each other. The requirement detector module 215 may then determine one or more connectivity paths between the plurality of IoT devices 101 including the first IoT device bused on stored connectivity paths between the plurality of IoT devices 101 in the database 103. For instance, the requirement detector module 215 may receive output values of the IoT devices connected or registered with the IoT assistance system 107. Based on the received output values, the requirement detector module 215 may route them to the input of the meaningfully possible IoT devices as appropriate to form a solution. For example, the output of a digital thermometer is fed as the input to a fan speed controller (or air cooler) via a digital switch. It can also be fed to the input of light intensity controller wherein the light intensity changes with temperature. The requirement detector module 215 may provide more than one realisable option. The module 215 may receive its input from the IoT devices through the I/O Interface 111 and at least one stored connectivity path from the database 103. The requirement detector module 215 may send at least one determined connectivity path to the winning path selector module 217.

The winning path selector module 217 may select one of the determined one or more connectivity paths between the plurality of IoT devices 101. In an embodiment, the selection is based on similarity of metadata of each of the plurality of IoT devices 101 in each of the one or more connectivity paths. The winning path selector module 217 may get alt possible connectivity paths spanning the IoT devices from the requirement detector module 215. One of the connectivity paths i.e. most appropriate for the intended application of the IoT devices or the IoT devices that may be driven under the given context may be selected as the winning path. The selection is made based on the match or similarity between the metadata of the output of the IoT device at the originating node (also, referred as a first IoT device) and metadata of the IoT device at the end of the connectivity path (also, referred as a second IoT device). For example, a digital thermometer output can have the metadata "Hot". The IoT devices at the end of two connectivity paths can be fan (with intended application of cooling, blowing etc.) and light bulb (with the application of illumination). The metadata "hot" has similarity with "cooling" than with "illumination". Therefore, the connectivity path originating from the thermometer (the first IoT device) and leading to the fan (the second IoT device) is selected. This simple solution may be formed adaptively by the IoT assistance system 107 to control the temperature of the surroundings.

In the eventuality of a breakdown of an IoT device in the selected connectivity path, the winning path selector module 217 may detect nearest matching device to overcome the IoT device failure. This method may be performed by first detecting a failure of one of the one or more IoT devices of the plurality of IoT devices 101 in the selected connectivity path followed by determining an alternate connectivity path between the plurality of IoT devices 101 including the first IoT device, wherein the determining an alternate connectivity path is based on the metadata of the plurality of IoT devices 101 in the selected connectivity path and metadata of plurality of IoT devices 101 in the stored connectivity paths. The winning path selector module 217 may get the at least one connectivity paths from the at least one stored connectivity path from the database 103 using the requirement detector module 215. The module 217 may send the one selected connectivity path to the tenderer module 219. The one selected connectivity path may, also, be referred to as a winning path.

The renderer module 219 may trigger one or more IoT devices of the plurality of IoT devices 101 in the selected connectivity path based on the change in output of the first IoT device. The renderer module 219 may receive the one selected connectivity path from the winning path selector module 217. In some embodiments, the renderer module 219 may receive a voice input from a user. The renderer module 219 may transfer the received voice input to the winning path selector module 217. The winning path selector module 217 may determine one or more keywords in the received voice input. Subsequently, the winning path selector module 217 may determine an IoT device in a connectivity path corresponding to the one or more keywords based on the metadata of each of the plurality of IoT devices 101 in each of the one or more connectivity paths. In the next step, the tenderer module 219 may trigger the IoT device in the determined connectivity path. The voice input from the user may be in natural language. For example, if the user says: "I am not able to read", the keywords "not" and "read" may lead to selection of a connectivity path with IoT devices that may switch ON a lamp. The user may, also, edit the IoT device and the connectivity path formed by the IoT assistance system 107 based on the UPnP protocol or the voice input. The user may edit or insert or delete the IoT devices and their corresponding metadata through the user interface. The renderer module 219 may receive the one selected connectivity path from the winning path selector module 217 and in addition to providing triggering signal to the one or more IoT devices, may render the selected connectivity path to the user over the user interface.

The user interaction module 221 may provide at least one of the plurality of IoT devices 101, the corresponding metadata and the selected connectivity path on the user interface and in return may receive one or more modified metadata for at least one of the plurality of IoT devices 101. This module 221 may determine one or more modified connectivity paths between the plurality of IoT devices 101 based on the one or more modified metadata. The determined one or more modified connectivity paths may be sent to the virtual mesh generator module 213 for updating the connectivity paths. Furthermore, the user interaction module 221 may send at least one of the one or more modified metadata Tor the at least one of the plurality of IoT devices 101 and the one or more modified connectivity paths to the rule extractor module 221 for updating the database 103. The user interaction module 221 may be used for providing metadata details required for winning path selection process. The user may be prompted to perform certain actions or enter some parameters related to applications and capabilities of IoT devices. In this process, the user may set parameters or adjust metadata relating the IoT devices and may, also, input information to tailor working of the IoT devices according to his/her choice. The IoT devices may learn to work the way the user may want them to work by generating the right control signals during the runtime. The user interaction module 221 may receive at least one of the plurality of IoT devices 101, the corresponding metadata and the selected connectivity path details from the renderer module 219 and may receive user input through the user interface. The output from the user interaction module 221 may sent to the database 103 via the rule extractor module 223 or to the database 103 directly and may, also, be sent to the virtual mesh generator module 213 for adaptively improving the generation of one or more connectivity path.

The rule extractor module 223 may extract the metadata required for the selection of the winning path from a plurality of sources such as the advertisement from the IoT devices through UPnP protocol, connectivity path, attributes received from the user interaction module 221, etc. The metadata may include at least one of information related to the IoT devices, intended services or applications of the IoT devices, service description of the IoT devices, subscription information of the IoT devices, device capabilities of the IoT devices, type of the IoT devices, location of the IoT devices, input and output information associated with the IoT devices and connectivity paths between the IoT devices in natural language representation. The user may perform simulation experiments i.e. to receive operating parameters for the one or more IoT devices in each connectivity path based on the change in the output of first IoT device in same connectivity path using the modules such as the requirement detector module 215, the winning path selector module 217 and the renderer module 219. For example, changes in the temperature of environment can be related to different speeds of a fan. The input to the rule extractor module 223 may be received from the user interaction module 221 and the output from the rule extractor module 223 may be stored in the database 103. The operating parameters for the one or more IoT devices along with the corresponding change in the output of first IoT device for each connectivity path may be stored in the database 103.

Figure 3:
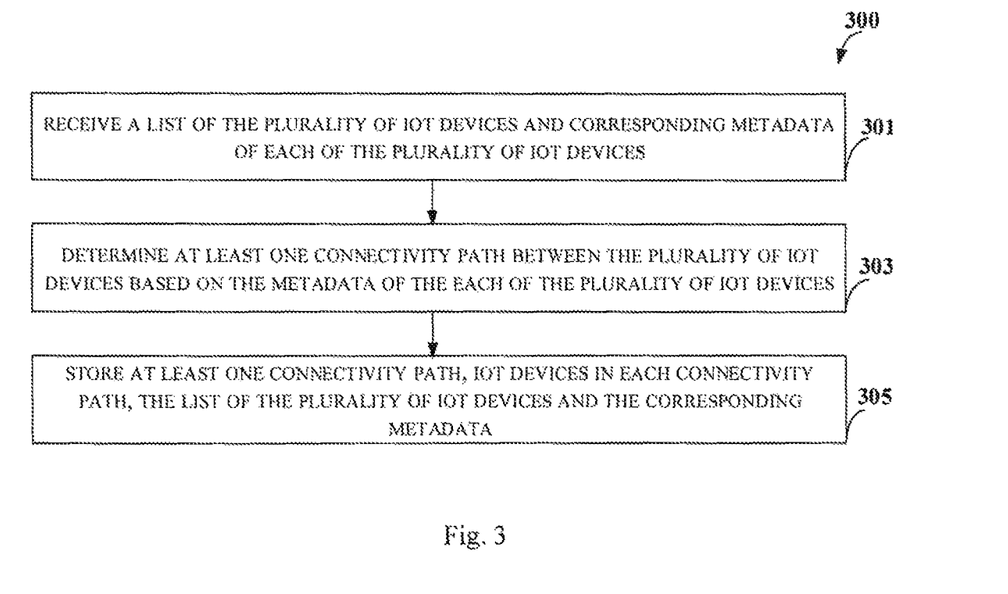
FIG. 3 illustrates a flowchart showing a method for populating a database to be used in determining connectivity paths for triggering of IoT devices in accordance with some embodiments of present disclosure.

FIG. 3 illustrates a flowchart showing a method for populating a database to be used in determining connectivity paths for triggering of IoT devices in accordance with some embodiments of present disclosure.

As illustrated in FIG. 3, the method 300 includes one or more blocks for populating a database 103 to be used in determining connectivity paths for triggering of IoT devices. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, a list of the plurality of IoT devices 101 and corresponding metadata of each of the plurality of IoT devices 101 may be received by the virtual mesh generator module 213 through the I/O interface 111.

At block 303, the virtual mesh generator module 213 may determine at least one connectivity path between the plurality of IoT devices 101 based on the metadata of the each of the plurality of IoT devices 101. In block 303, possible connectivity paths from the interactions of different IoT devices in the IoT list may be generated based on the received list of the plurality of IoT devices 101 and corresponding metadata. The connectivity paths may be generated through a plurality of techniques. In first implementation, the IoT devices may advertise their capabilities using UPnP protocol. The IoT device capabilities may be stored as a metadata associated with the IoT device. Once the IoT devices are capable of communicating to each other, corresponding capabilities of the IoT devices may be connected. For example, if a digital thermometer can provide temperature data, a digital fan switch can read the temperature value and control the speed of a fan. In this case, the thermometer can be directly configured to control the fan speed.

In second implementation, a user may directly try to connect the plurality of IoT devices 101 through the user interface. The user may specify what he/she may want to achieve through the plurality of IoT devices 101. For example, the user may choose the digital thermometer (first IoT device) to specify the output as temperature and choose a digital switch as another device (second IoT device) and connect them. For the digital switch, the user may specify the input as the temperature and output as speed of the fan (third IoT device). This natural language specification may be translated into a valid connectivity path. The conversion of user specification in natural language to appropriate IoT device happens through a Long Short-Term Memory (LSTM, an artificial recurrent neural network architecture) unit/network (not shown in Fig.). The LSTM unit/network may be trained to take user specifications as input sentence and map to the IoT device by focusing on the metadata of the IoT device. For instance, the LSTM unit/network may map keywords such as "heat", "hot", etc. to the metadata of a fan or air conditioner/cooler. If more than one IoT device matches based on the metadata, the most appropriate one may be chosen based on user preferences input through the user interlace or based on the degree of match/similarity. For example, if air cooler and fan are the IoT devices, the IoT assistance system 107 may recommend air cooler to reduce the ambient temperature. For example, if the IoT device is a voltage regulated switch wherein the speed of the fan depends on the control voltage, the IoT assistance system 107 may need to generate this control voltage from the temperature. The IoT assistance system 107 may prompt the user to perform the experiment of relating the speed of the fan to the temperature by asking for a change in temperature and mapping the changed temperature with the fan speed.

In third implementation, a combination of the first implementation and the second implementation may be used. In this case, the UPnP protocol may provide possible connectivity path by interpreting the IoT device capability input in natural language. In the next step, the user may edit or amend the possible connectivity path using the user interface.

At block 305, the virtual mesh generator module 213 may store the at least one connectivity path, IoT devices in each connectivity path, the list of the plurality of IoT devices and the corresponding metadata in the database 103.

Figure 4A:
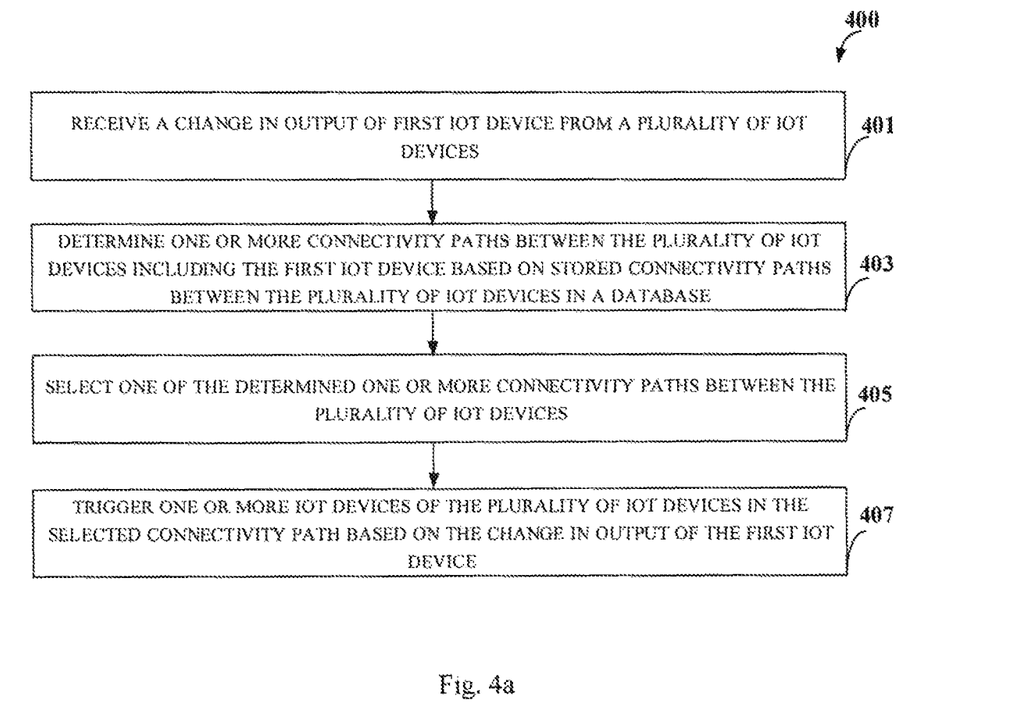
FIG. 4a-4c illustrate flowcharts showing a method for triggering of IoT devices in accordance with some embodiments of the present disclosure.
Figure 4B:
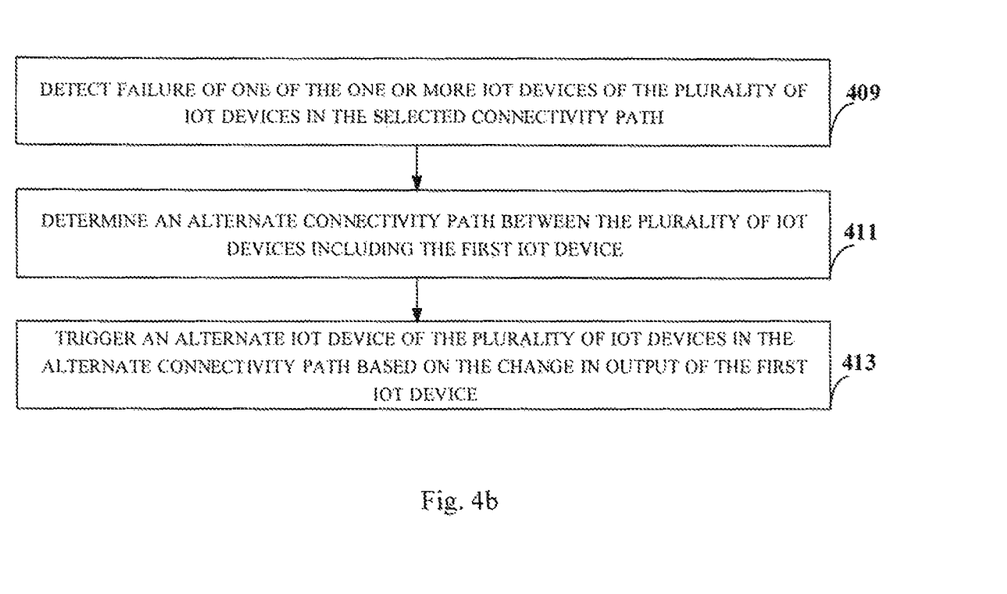
Figure 4C:
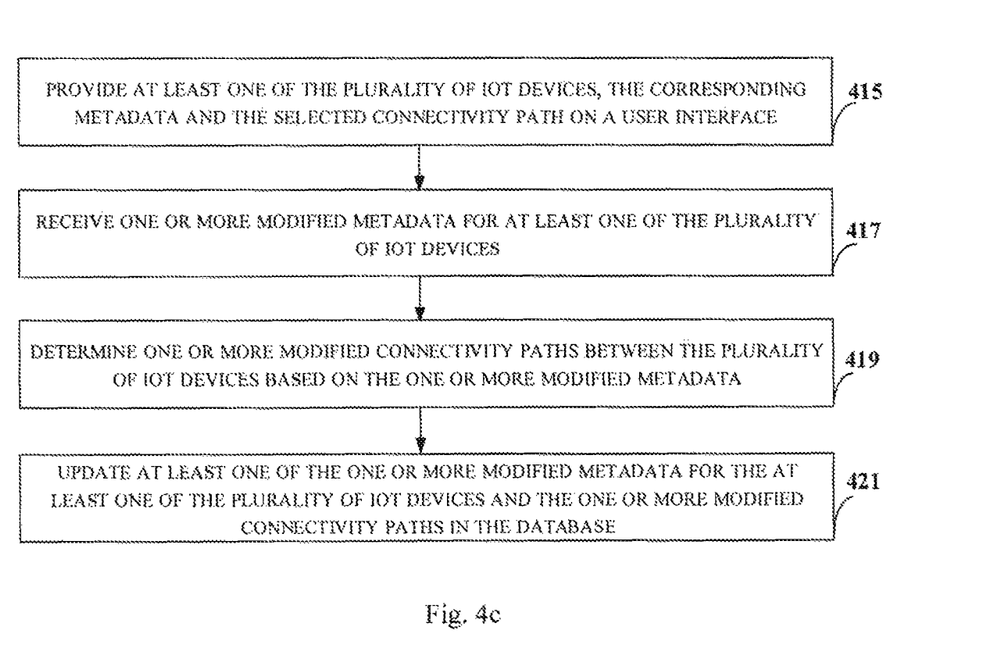

FIG. 4a illustrates a flowchart showing a method for triggering of IoT devices based on a change in output of first IoT device in accordance with some embodiments of the present disclosure. FIG. 4b illustrates a flowchart showing a method of triggering of an alternate IoT device based on detection of failure of an IoT device in accordance with some embodiments of the present disclosure. FIG. 4c illustrates a flowchart showing a method of updating connectivity paths along with IoT devices and their metadata in accordance with some embodiments of the present disclosure.

As illustrated in FIG. 4a-FIG. 4c, the method 400 includes one or more blocks for triggering of IoT devices in general. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the requirement detector module 215 may receive a change in output of first IoT device from a plurality of IoT devices 101. The plurality of IoT devices 101 are connected to each other.

At block 403, the requirement detector module 215 may determine one or more connectivity paths between the plurality of IoT devices 101 including the first IoT device based on stored connectivity paths between the plurality of IoT devices 101 in a database 103. At the block 403, the need of possible formation of connectivity paths between the IoT devices may be detected at real-time. The connectivity path determination may start as soon as an IoT detects a trigger or extreme/exceptional condition to address. The determination of one or more connectivity paths may happen in multiple stages. The requirement detector module 215 may look for the surrounding IoT devices based on stored connectivity paths between the plurality of IoT devices 101 in the database 103. For instance, a thermometer may get connected to a digital switch and the switch in turn may be connected to a fan, a light (that can control brightness) and the garage door. Accordingly, there may be one or more connectivity paths between the IoT devices.

At block 405, the winning path selector module 217 may select one of the determined one or more connectivity paths between the plurality of IoT devices 101, wherein the selecting is based on similarity of metadata of each of the plurality of IoT devices 101 in each of the one or more connectivity paths. At the block 405, the most appropriate path may be selected from the several connectivity paths generated in the block 403. The connectivity path may be selected based on a plurality of parameters or metadata. For instance, for each of the IoT devices in the table 1 (previously), a column indicating the application may be attached.

For example, for a fan, it may be reduction in temperature, cooling, drying blowing etc. The equivalent words may be taken from a dictionary. These metadata may be filled by the user explicitly or may be derived from an IoT device manual. User actions may, also, implicitly mean the application type. For example, whenever the user increases the speed of a fan, it is implied that temperature may be high (for example, higher than 35° C.). I.e. when the user increases the speed of the fan, the output status may change in the other IoTs in a connectivity path, which may be noted. If the pattern of consistent increase of temperature around a threshold say 35° C. may be noted, it may be associated with the fan speed as the metadata. The winning path may be chosen if any of the metadata is found on the connectivity path. For example, a word "cooling" found with the fan may be associated with the temperature may ensure the winning path is between the fan and thermometer (and not between a light bulb and the thermometer). This matching may be performed by LSTM unit/network. The matching captures the relation between the metadata of the IoT devices. For example, Hot-cold, Hot-warm, etc. spanning synonyms and antonyms starts from a source device (a first IoT device) along a connectivity path. Also, the user may edit these metadata as per the user's requirements.

At block 407, the renderer module 219 may trigger one or more IoT devices of the plurality of IoT devices 101 in the selected connectivity path based on the change in output of the first IoT device. In the block 407, the selected connectivity path may, also, be depicted to the user to further develop the connectivity among the IoT devices. User may illustrate the connectivity path between the IoT devices. The editing of user may be used for fine tuning of parameters/metadata of the IoT devices.

FIG. 4b illustrates a flowchart showing a method of triggering of an alternate IoT device based on detection of failure of an IoT device in accordance with some embodiments of the present disclosure.

At block 409, the winning path selector module 217 may detect failure of one of the one or more IoT devices of the plurality of IoT devices 101 in the selected connectivity path.

At block 411, the winning path selector module 217 may determine an alternate connectivity path between the plurality of IoT devices 101 including the first IoT device. The determining an alternate connectivity path may be based on the metadata of the plurality of IoT devices 101 in the selected connectivity path and metadata of plurality of IoT devices 101 in the stored connectivity paths. For instance, if one of the IoT device fails in the connectivity path, the winning path selector module 217 may find the nearest IoT device of the same type or similar functionality. This may be possible from the metadata mentioned in table 1 and location of these devices. For example, in surveillance, if the battery power of the camera gets drained out, it can handover the functionality to another camera nearby (assuming it spans the overlapping area) although the resolution of this camera is lesser.

At block 413, the renderer module 219 may trigger an alternate IoT device of the plurality of IoT devices 101 in the alternate connectivity path based on the change in output of the first IoT device.

FIG. 4c illustrates a flowchart showing a method of updating connectivity paths along with IoT devices and their metadata in accordance with some embodiments of the present disclosure.

At block 415, the renderer module 219 may provide at least one of the plurality of IoT devices 101 the corresponding metadata and the selected connectivity path on a user interface.

At block 417, the tenderer module 219 may receive one or more modified metadata for at feast one of the plurality of IoT devices 101.

At block 419, the virtual mesh generator module 213 and/or the rule extractor module 221 may determine one or more modified connectivity paths between the plurality of IoT devices 101 based on the one or more modified metadata.

At block 421, the virtual mesh generator module 213 and/or the rule extractor module 221 may update at least one of the one or more modified metadata for the at least one of the plurality of IoT devices 101 and the one or more modified connectivity paths in the database 103.

An embodiment of the present disclosure triggers IoT devices based on their capabilities, the application and context. For example, if a person had a brisk walk (sensed through an accelerometer), the increased blood pressure (from a blood pressure sensor) triggers a heart-beat sensor. Based on the outcome of the heart-beat sensor, the IoT devices trigger a Holter ECG measurement. If the measurements are dangerously abnormal, the IoT device dials an ambulance. These IoT devices are to be triggered in sequence on their own at a right time based on a common goal and then take a consolidated decision.

An embodiment of the present disclosure provides an alternate connectivity path in case an IoT device breaks down in a connectivity path, thereby, overcoming the IoT device failures. For instance, when a device stops working or damaged, a functionally similar or nearest matching IoT device is selected dynamically to continue desired service seamlessly.

An embodiment of the present disclosure allows user to specify the connectivity relation between IoT devices to suit his/her requirement in natural language i.e. input in users' voice. Furthermore, input through natural language allows the user the flexibility to dynamically trigger desired IoT devices.

Computing System

Figure 5:
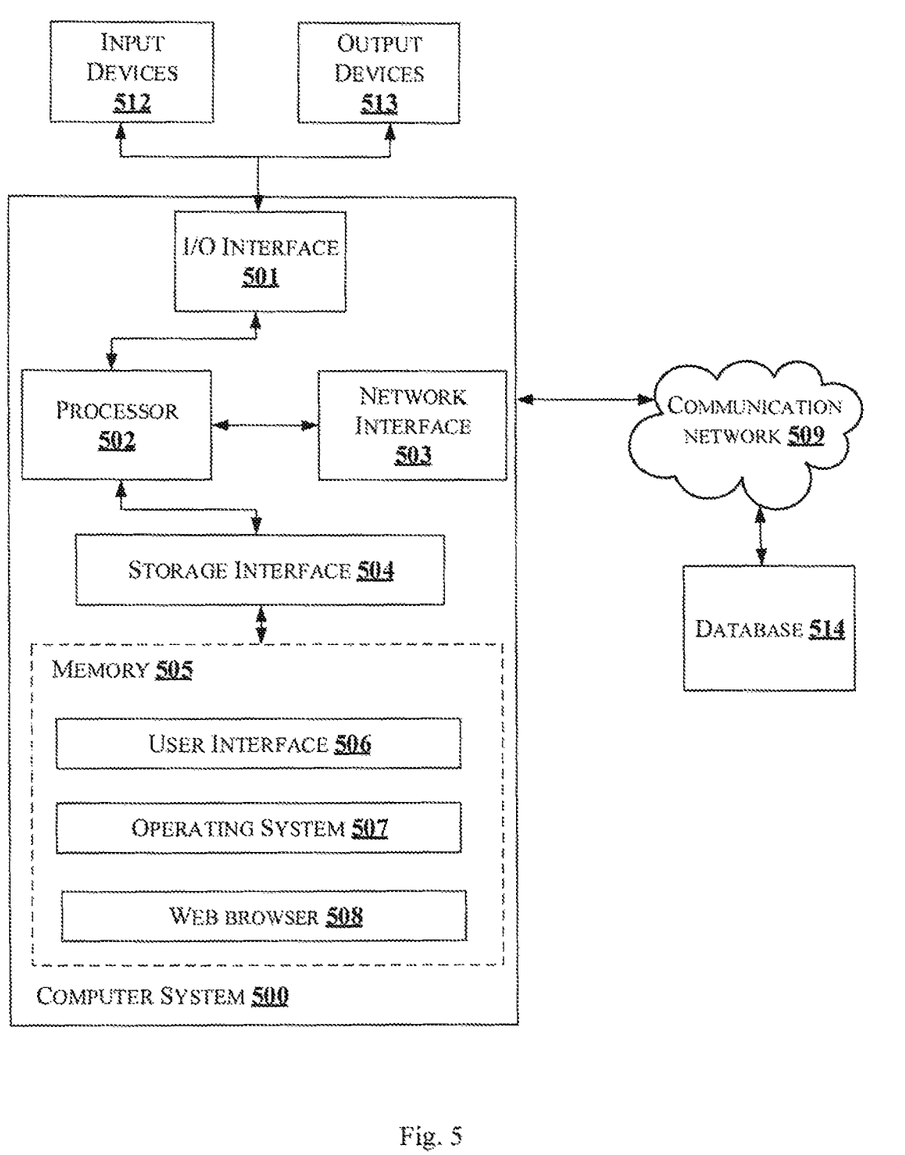
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the assistance system 107. The computer system 500 may include a central processing unit ("CPU" or "processor") 502. The processor 502 may include at least one data processor for triggering of Internet of things (IoT) devices. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 employ communication protocols/methods such as, without limitation, audio, analog, digital, monoaural, Radio Corporation of America (RCA) connector, stereo, IEEE-1394 high speed serial bus, serial bus, Universal serial bus (USB), infrared, Personal system/2 (PS/2) port, Bayonet Neill-Concelman (BNC) connector, coaxial, component, composite, Digital visual interface (DVI), High-definition multimedia interface (HDMI), Radio frequency (RF) antennas, S-Video, Video graphics array (VGA), IEEE 802.11b/g/n/x, Bluetooth, cellular (e.g., Code-division multiple access (CDMA), High-speed packet access (HSPA+), Global system for mobile communications (GSM). Long-term evolution (LTE). Worldwide interoperability for microwave access (WiMax), or the like, etc.

Using the I/O interface 501, the computer system 500 may communicate with one or more I/O devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 513 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the assistance system 107. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission control protocol/internet protocol (TCP/IP), token ring, IEEE 802.11a/b/g/n/x, etc. The communication network 509 may include, without limitation, a direct interconnection, Local area network (LAN), Wide area network (WAN), wireless network (e.g., using Wireless Application Protocol), the Internet, etc. Using the network interface 503 and the communication network 509, the computer system 500 may communicate with a database 514. The network interface 503 may employ connection protocols include, but not limited to, direct connect, Ethernet (e.g., twisted pair 10/100/1000 Base T). Transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, Local area network (LAN), Wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example. Hypertext transfer protocol (HTTP), Transmission control protocol/internet protocol (TCP/IP), Wireless application protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, Serial advanced technology attachment (SATA), Integrated drive electronics (IDE), IEEE-1394, Universal serial bus (USB), fiber channel, Small computer systems interface (SCSI), etc. The memory drives may further include a drum, magnetic disc drive, magneto-optical drive, optical drive, Redundant array of independent discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems 507 include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.). IBM™ OS/2, MICROSOFT™ WINDOWS™ (XP™, VISTA™/7/8, 10 etc.), APPLER IOS™, GOOGLER ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure hypertext transport protocol (HTTPS), Secure sockets layer (SSL), Transport layer security (TLS), etc. Web browsers 508 may utilize facilities such as AJAX™, DHTML™, ADOBE® FLASH™, JAVASCRIPT™, JAVA™, JAVA™, Application Programming Interfaces (APIs), etc. In some embodiments, the computer system 500 may implement a mail server (not shown in fig.) stored program component. The mail server may be an Internet mail server such as Microsoft Exchange, or the like. The mail server may utilize facilities such as ASP™, ACTIVEX™, ANSI™ C++/C#, MICROSOFT®, NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client (not shown in fig.) stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure triggers IoT devices based on their capabilities, the application and context.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 4a, 4b and 4c show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| $101_1, 101_2 \ldots 101_N$ | IoT Devices |
| 103 | Database |
| 105 | Communication network |
| 107 | Assistance system |
| 111 | I/O interface |
| 113 | Memory |
| 115 | Processor |
| 200 | Data |
| 201 | IoT List data |
| 203 | Meta-block data |
| 205 | Other data |
| 211 | Modules |
| 213 | Virtual mesh generator module |
| 215 | Requirement module |
| 217 | Winning path selector module |
| 219 | Renderer module |
| 221 | User interaction module |
| 223 | Rule extractor module |
| 225 | Other modules |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | Database |

What is claimed is:

1. A method of triggering of Internet of Things (IoT) devices, the method comprising:
   receiving, by an IoT assistance system, a change in output of first IoT device from a plurality of IoT devices, wherein the plurality of IoT devices are connected to each other;
   determining, by the IoT assistance system, one or more connectivity paths between the plurality of IoT devices including the first IoT device based on stored connectivity paths between the plurality of IoT devices in a database;
   selecting, by the IoT assistance system, one of the determined one or more connectivity paths between the plurality of IoT devices using a Long Short-Term Memory (LSTM) unit, wherein the selecting is based on similarity of relation between metadata of each of the plurality of IoT devices found in each of the one or more connectivity paths, wherein the metadata comprises at least one of information related to the IoT devices, intended services or applications of the IoT devices, service description of the IoT devices, subscription information of the IoT devices, device capabilities of the IoT devices, type of the IoT devices, location of the IoT devices, input and output information associated with the IoT devices and connectivity paths between the IoT devices in natural language representation; and
   providing, by the IoT assistance system, a trigger signal to one or more IoT devices of the plurality of IoT devices to operate according to the device capabilities, the intended application and context in a selected connectivity path based on real-time changed output of the first IoT device, wherein the trigger signal to one or more IoT devices of the plurality of IoT devices in the selected connectivity path is provided based on similarity between the metadata of the output of the first IoT device and the metadata of an IoT device at the end of the selected connectivity path.

2. The method as claimed in claim 1, the method further comprising:
   detecting, by the IoT assistance system, failure of one of the one or more IoT devices of the plurality of IoT devices in the selected connectivity path;
   determining, by the IoT assistance system, an alternate connectivity path between the plurality of IoT devices including the first IoT device, wherein the determining the alternate connectivity path is based on the metadata of the plurality of IoT devices in the selected connectivity path and metadata of plurality of IoT devices in the stored connectivity paths; and
   triggering, by the IoT assistance system, an alternate IoT device of the plurality of IoT devices in the alternate connectivity path based on the real-time changed output of the first IoT device.

3. The method as claimed in claim 1, wherein the database is populated by:
   receiving, by the IoT assistance system, a list of the plurality of IoT devices and corresponding metadata of each of the plurality of IoT devices;
   determining, by the IoT assistance system, at least one connectivity path between the plurality of IoT devices based on the metadata of the each of the plurality of IoT devices; and
   storing, by the IoT assistance system, the at least one connectivity path, IoT devices in each connectivity path, the list of the plurality of IoT devices and the corresponding metadata.

4. The method as claimed in claim 3, further comprising:
   receiving, by the IoT assistance system, operating parameters for the one or more IoT devices in each connectivity path based on the change in the output of first IoT device in same connectivity path; and
   storing, by the IoT assistance system, the operating parameters for the one or more IoT devices along with the corresponding change in the output of first IoT device for each connectivity path in the database.

5. The method as claimed in claim 1, further comprising:
   providing, by the IoT assistance system, at least one of the plurality of IoT devices, the corresponding metadata and the selected connectivity path on a user interface;
   receiving, by the IoT assistance system, one or more modified metadata for at least one of the plurality of IoT devices;

determining, by the IoT assistance system, one or more modified connectivity paths between the plurality of IoT devices based on the one or more modified metadata; and updating, by the IoT assistance system, at least one of the one or more modified metadata for the at least one of the plurality of IoT devices and the one or more modified connectivity paths in the database.

6. The method as claimed in claim 1, further comprising:
receiving, by the IoT assistance system, a voice input from a user;
determining, by the IoT assistance system, one or more keywords in the received voice input;
determining, by the IoT assistance system, an IoT device in a connectivity path corresponding to the one or more keywords based on the metadata of each of the plurality of IoT devices in each of the one or more connectivity paths; and
providing, by the IoT assistance system, the trigger signal to the IoT device in a determined connectivity path.

7. An IoT assistance system for triggering of Internet of Things (IoT) devices, the system comprising:
a processor; and
a memory communicatively coupled to the processor, wherein the memory stores processor-executable instructions, which on execution, cause the processor to:
receive a change in output of first IoT device from a plurality of IoT devices, wherein the plurality of IoT devices are connected to each other;
determine one or more connectivity paths between the plurality of IoT devices including the first IoT device based on stored connectivity paths between the plurality of IoT devices in a database;
select one of the determined one or more connectivity paths between the plurality of IoT devices using a Long Short-Term Memory (LSTM) unit, wherein the selecting is based on similarity of relation between metadata of each of the plurality of IoT devices found in each of the one or more connectivity paths, wherein the metadata comprises at least one of information related to the IoT devices, intended services or applications of the IoT devices, service description of the IoT devices, subscription information of the IoT devices, device capabilities of the IoT devices, type of the IoT devices, location of the IoT devices, input and output information associated with the IoT devices and connectivity paths between the IoT devices in natural language representation; and
provide a trigger signal to one or more IoT devices of the plurality of IoT devices to operate according to the device capabilities, the intended application and context in a selected connectivity path based on real-time changed output of the first IoT device, wherein the trigger signal to one or more IoT devices of the plurality of IoT devices in the selected connectivity path is provided based on similarity between the metadata of the output of the first IoT device and the metadata of an IoT device at the end of the selected connectivity path.

8. The IoT assistance system as claimed in claim 7, the system causes the processor to:
detect failure of one of the one or more IoT devices of the plurality of IoT devices in the selected connectivity path;

determine an alternate connectivity path between the plurality of IoT devices including the first IoT device, wherein the determining the alternate connectivity path is based on the metadata of the plurality of IoT devices in the selected connectivity path and metadata of plurality of IoT devices in the stored connectivity paths; and
trigger an alternate IoT device of the plurality of IoT devices in the alternate connectivity path based on the real-time changed output of the first IoT device.

9. The IoT assistance system as claimed in claim 7, the system causes the processor to populate the database by:
receiving a list of the plurality of IoT devices and corresponding metadata of each of the plurality of IoT devices;
determining at least one connectivity path between the plurality of IoT devices based on the metadata of the each of the plurality of IoT devices; and
storing the at least one connectivity path, IoT devices in each connectivity path, the list of the plurality of IoT devices and the corresponding metadata.

10. The IoT assistance system as claimed in claim 9, the system causes the processor to:
receive operating parameters for the one or more IoT devices in each connectivity path based on the change in the output of first IoT device in same connectivity path; and
store the operating parameters for the one or more IoT devices along with the corresponding change in the output of first IoT device for each connectivity path in the database.

11. The IoT assistance system as claimed in claim 7, the system causes the processor to:
provide at least one of the plurality of IoT devices, the corresponding metadata and the selected connectivity path on a user interface;
receive one or more modified metadata for at least one of the plurality of IoT devices;
determine one or more modified connectivity paths between the plurality of IoT devices based on the one or more modified metadata; and
update at least one of the one or more modified metadata for the at least one of the plurality of IoT devices and the one or more modified connectivity paths in the database.

12. The IoT assistance system as claimed in claim 7, the system causes the processor to:
receive a voice input from a user;
determine one or more keywords in the received voice input;
determine an IoT device in a connectivity path corresponding to the one or more keywords based on the metadata of each of the plurality of IoT devices in each of the one or more connectivity paths; and
provide the trigger signal to the IoT device in a determined connectivity path.

13. A non-transitory computer readable medium including instructions stored thereon that when processed by at least one processor cause an IoT assistance system to perform operations comprising:
receiving a change in output of first IoT device from a plurality of IoT devices, wherein the plurality of IoT devices are connected to each other;
determining one or more connectivity paths between the plurality of IoT devices including the first IoT device based on stored connectivity paths between the plurality of IoT devices in a database;

selecting one of the determined one or more connectivity paths between the plurality of IoT devices using a Long Short-Term Memory (LSTM) unit, wherein the selecting is based on similarity of relation between metadata of each of the plurality of IoT devices found in each of the one or more connectivity paths, wherein the metadata comprises at least one of information related to the IoT devices, intended services or applications of the IoT devices, service description of the IoT devices, subscription information of the IoT devices, device capabilities of the IoT devices, type of the IoT devices, location of the IoT devices, input and output information associated with the IoT devices and connectivity paths between the IoT devices in natural language representation; and providing a trigger signal to one or more IoT devices of the plurality of IoT devices to operate according to the device capabilities, the intended application and context in a selected connectivity path based on real-time changed output of the first IoT device, wherein the trigger signal to one or more IoT devices of the plurality of IoT devices in the selected connectivity path is provided based on similarity between the metadata of the output of the first IoT device and the metadata of an IoT device at the end of the selected connectivity path.

14. The medium as claimed in claim 13, wherein the instructions cause the processor to:
   detect failure of one of the one or more IoT devices of the plurality of IoT devices in the selected connectivity path;
   determine an alternate connectivity path between the plurality of IoT devices including the first IoT device, wherein the determining the alternate connectivity path is based on the metadata of the plurality of IoT devices in the selected connectivity path and metadata of plurality of IoT devices in the stored connectivity paths; and
   trigger an alternate IoT device of the plurality of IoT devices in the alternate connectivity path based on the real-time changed output of the first IoT device.

15. The medium as claimed in claim 13, wherein the instructions cause the processor to populate the database by:
   receiving a list of the plurality of IoT devices and corresponding metadata of each of the plurality of IoT devices;
   determining at least one connectivity path between the plurality of IoT devices based on the metadata of the each of the plurality of IoT devices; and
   storing the at least one connectivity path, IoT devices in each connectivity path, the list of the plurality of IoT devices and the corresponding metadata.

16. The medium as claimed in claim 13, wherein the instructions cause the processor to:
   provide at least one of the plurality of IoT devices, the corresponding metadata and the selected connectivity path on a user interface;
   receive one or more modified metadata for at least one of the plurality of IoT devices;
   determine one or more modified connectivity paths between the plurality of IoT devices based on the one or more modified metadata; and
   update at least one of the one or more modified metadata for the at least one of the plurality of IoT devices and the one or more modified connectivity paths in the database.

17. The medium as claimed in claim 13, wherein the instructions cause the processor to:
   receive a voice input from a user;
   determine one or more keywords in the received voice input;
   determine an IoT device in a connectivity path corresponding to the one or more keywords based on the metadata of each of the plurality of IoT devices in each of the one or more connectivity paths; and
   provide the trigger signal to the IoT device in a determined connectivity path.

* * * * *